W. A. CRAWFORD-FROST.
COMBINED AEROPLANE AND PARACHUTE.
APPLICATION FILED JAN. 3, 1911.
1,005,609.
Patented Oct. 10, 1911.
2 SHEETS—SHEET 2.
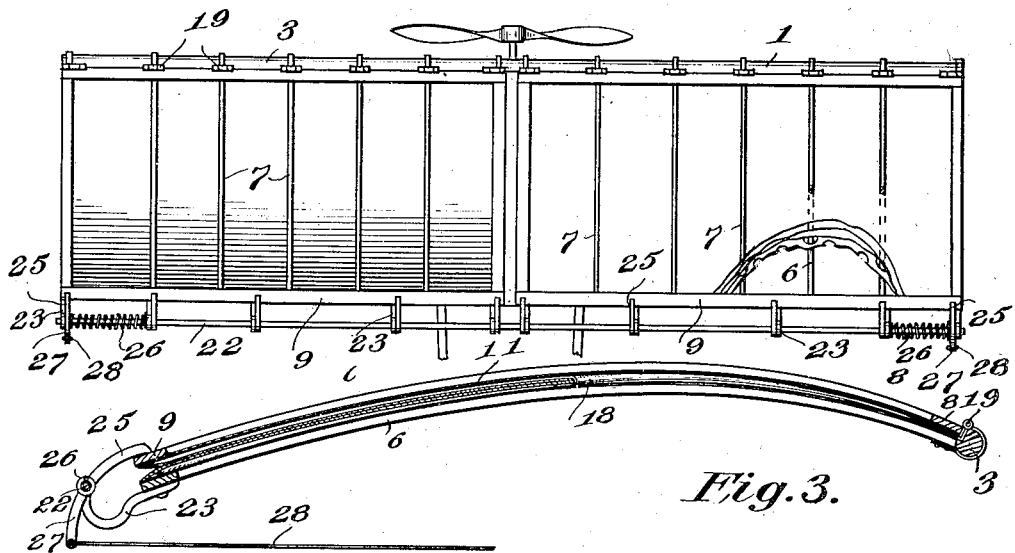
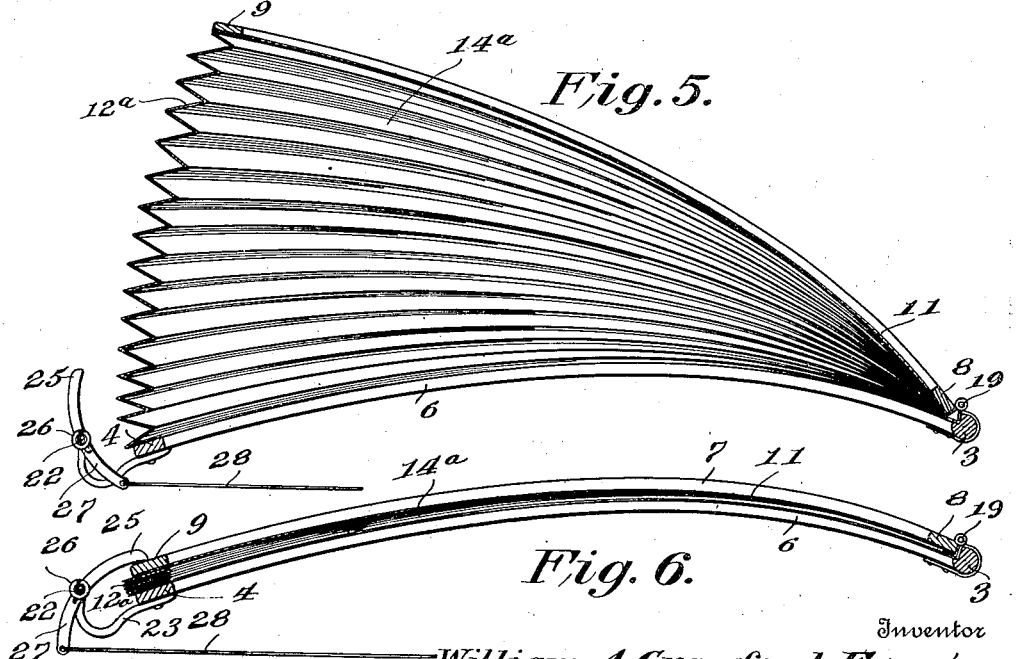

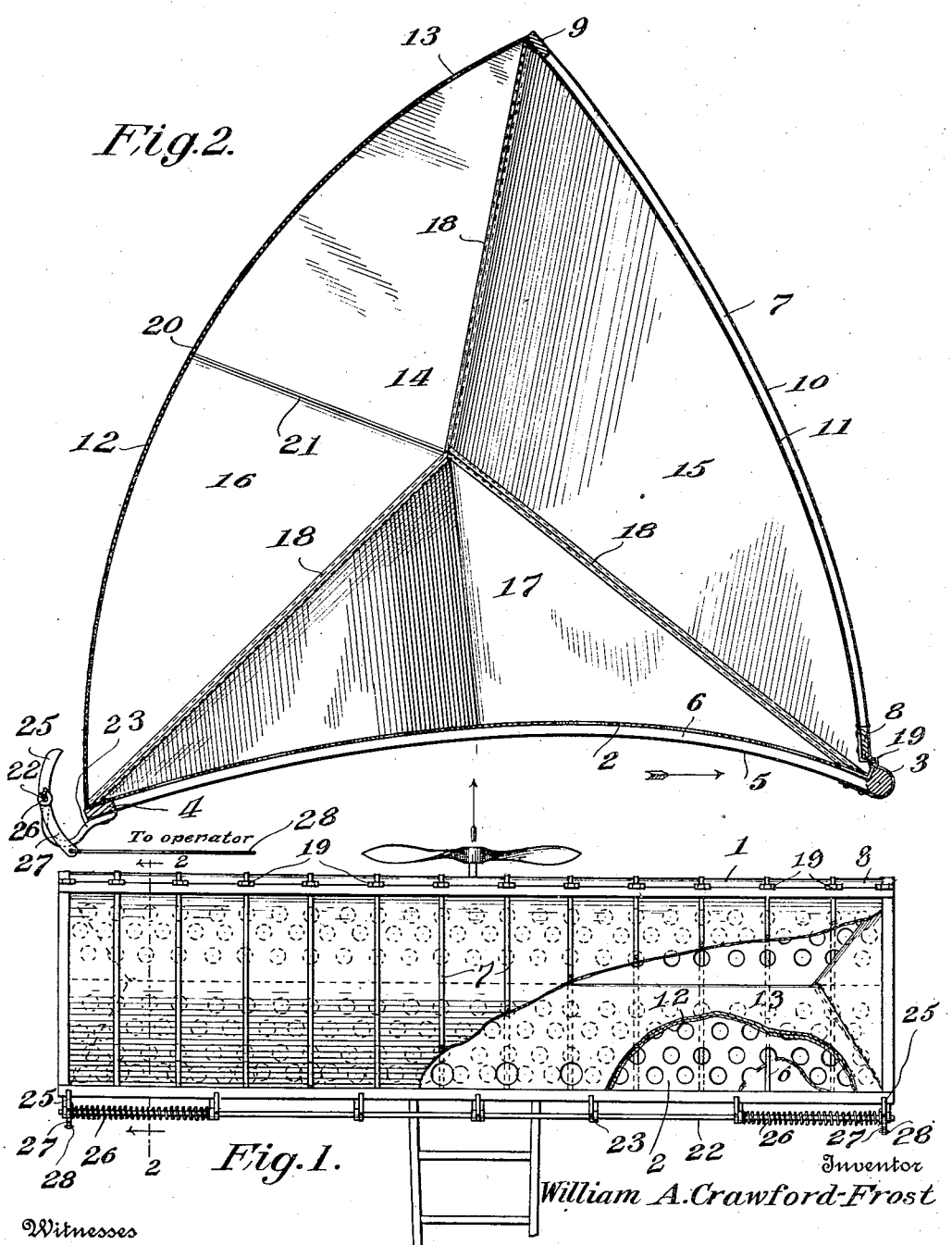

UNITED STATES PATENT OFFICE.

WILLIAM A. CRAWFORD-FROST, OF BALTIMORE, MARYLAND.

COMBINED AEROPLANE AND PARACHUTE.

1,005,609.   Specification of Letters Patent.   Patented Oct. 10, 1911.

Application filed January 3, 1911. Serial No. 600,485.

*To all whom it may concern:*

Be it known that I, WILLIAM A. CRAWFORD-FROST, a citizen of the United States, residing at Baltimore, in the State of Maryland, have invented new and useful Improvements in Combined Aeroplanes and Parachutes, of which the following is a specification.

This invention relates to aeroplanes or supporting surfaces for flying machines, and particularly to a combined supporting plane and parachute.

The main object of the invention is to provide a supporting plane having a parachute portion which is normally in collapsed condition, and is adapted to automatically open when the machine falls or its speed drops below the sustentation limit to maintain the machine in a balanced position and allow it to slowly descend to the ground.

A further object of the invention is to provide a combined plane and parachute which is simple of construction and in which means, releasable at the will of the pilot or aviator, may be employed to hold the parachute portion collapsed.

The invention consists of the features of construction, combination and arrangement of parts, hereinafter fully described and claimed, reference being had to the accompanying drawings, in which:—

Figure 1 is a top plan view of a combined aeroplane and parachute embodying my invention, showing the parachute portion collapsed and portions broken away to better illustrate the construction. Fig. 2 is an enlarged fore and aft section on the line 2—2 of Fig. 1, showing the parachute extended for operation. Fig. 3 is a section similar to Fig. 2, showing the parachute collapsed. Fig. 4 is a plan view of a supporting plane having two parachute sections. Fig. 5 is a view, showing a modified form of parachute in partially extended position. Fig. 6 is a similar view, showing the same collapsed.

Refering to the drawings, 1 designates a supporting plane, curved fore and aft in the usual manner and comprising a fabric covering 2 stretched over a frame formed of front and rear longitudinal bars 3 and 4 and any desired number of end bars and connecting ribs 5. The fabric 2 in the present construction is provided with perforations or openings 6 for the admission of air to the extended parachute section, which openings are closed by the parachute section when the latter is in folded or collapsed condition.

The parachute section comprises a rigid frame portion 7, which may be coextensive in size with the supporting frame in the provision of a single parachute section, as shown in Figs. 1, 2 and 3, or equal in dimensions to one of the wings or sections of the plane where two parachute sections are employed, as illustrated in Fig. 4. This frame portion is adapted to snugly overlie the upper surface of the supporting plane when the parachute section is collapsed, and consists of a front longitudinal bar 8, and rear longitudinal bar 9, ribs 10 connecting said bars, and a suitable imperforate fabric covering 11, which latter forms the upper surface of the supporting plane when the parachute section is collapsed.

Secured at its lower longitudinal edge to the bar 4 and at its upper longitudinal edge to the bar 9 is a fabric section 12, which forms the rear wall of the extended parachute. The fabric sections 11 and 12 are shaped so as to curve upwardly and inwardly on converging lines from the bars 4 and 8 to the bar 9 in the extension of the parachute section, so as to cause the air on its upward flow to become compacted for supporting effect, the section 12 being provided at a point adjacent to the apex of the extended parachute with one or more openings 13 for the slow and continued vent of air to secure the required supporting effect and prevent oscillations of the machine, as will be understood.

The parachute section is completed by the provision of end fabric sections 14, each of which is composed of triangular portions 15, 16 and 17, said triangular portions being connected by suitable seams 18. As shown, the lower or front edge of the frame 10 is hinged to the bar 3 to swing in a vertical plane, so that the parachute may be extended to the open position illustrated in Fig. 2 or to the collapsed position shown in Figs. 1 and 3. In the folding of the parachute section, the frame 10 swings downwardly onto the top of the main frame, in which action the upper and lower portions of the fabric section 12 fold inwardly at the center 20 between the plane and frame and in superposed relation, while the end wall folds inwardly along the line of the seams 18, the section 17 folding inwardly onto the fabric 2, the upper and lower portions of the sections 16 bending along the line 21 and respectively folding rearwardly between the frame 7 and upper portion of the fabric section 12 and between the main plane and lower portion of said fabric section 12, and the portion 15 folding inwardly on a line between the frame and the upper portion of the section 12, whereby the parachute is adapted to lie in close compass against the upper surface of the supporting plane.

When the machine is traveling in a straight line at sustentation or greater speed, the air reacts dynamically upon the bottom surface of the plane in the usual way, and has no pressure upon the parachute section, the latter being held collapsed by its own weight and the reacting pressure of the air above. If desired, however, means may be provided for positively holding the parachute section collapsed, so as to prevent of the extension of the parachute under some conditions and place the opening of the parachute under the control of the pilot or aviator. To this end I provide a latch device comprising a longitudinal shaft 22 journaled in suitable bearing brackets 23 on the rear longitudinal bar 4 and carrying a series of latch hooks 25 adapted to engage the rear cross bar 9 of the frame 10 to hold the collapsed parachute from opening movement. Springs 26 act upon the shaft 22 to normally hold the hooks 25 in engaging position, and at a suitable point a crank arm 27 depends from the shaft and is connected with a cord or wire 28 leading to a suitable position with the aviator, who by pulling the cord may rock the shaft to throw the latch hooks to the retracted position illustrated in Fig. 2, allowing the parachute to open in the event of danger or when it is desired to employ the same as a wind brake to check the speed of descent of the machine in making a landing.

In Figs. 5 and 6, I have shown a modified form of the invention wherein the fabric sections 12ª and 14ª on the parachute are provided with accordion plaits adapted to fold or nest together in the collapse of the parachute, as illustrated in Fig. 6, which construction may be advantageously employed, if desired.

Having thus described the invention, I claim:—

1. A supporting plane having a fabric covering provided with openings, and a parachute adapted to fold or collapse upon the top of the plane and close said openings, and to open upwardly to extended position, one of the walls of said parachute being provided with a vent aperture.

2. A supporting plane provided with openings, and a parachute formed of walls adapted to fold or collapse upon the top of the plane and close said openings, and to open upwardly to extended position, said parachute being provided with a vent aperture.

3. A supporting plane, a rigid wall hinged to the front of the plane, a flexible wall secured to the rear edge of the plane and free edge of the rigid frame, and flexible end walls secured to the plane, rigid frame and flexible rear wall and forming a parachute adapted to open upwardly to an extended position and to collapse upon the upper surface of the supporting plane with said flexible walls in folded relation.

4. A supporting plane, a rigid frame hinged to the front of the supporting plane to swing forwardly to an upright position and swing downwardly and rearwardly to a position above the plane, and collapsible rear and side walls secured to said frame and to the plane and forming therewith a parachute, said walls being provided with infolding portions to adapt said parachute to collapse in substantially flat condition upon the plane.

5. A supporting plane, a parachute comprising a front rigid frame section adapted to swing upwardly to a vertical position and downwardly to a horizontal position upon the plane, and flexible rear and end walls secured to the frame and plane, said flexible walls being provided with bellows portions adapted to fold inwardly together to permit the parachute to collapse, and means for holding the parachute collapsed and releasing it to permit it to open and fill.

In testimony whereof I affix my signature in presence of two witnesses.

WILLIAM A. CRAWFORD-FROST.

Witnesses:
GEORGE W. MANLY,
WILLIAM L. McCLEARY.